(12) United States Patent
Oldham

(10) Patent No.: US 6,694,333 B2
(45) Date of Patent: Feb. 17, 2004

(54) SYSTEMS AND METHODS OF REFERENCING UNIFORM RESOURCE LOCATORS

(75) Inventor: Don A. Oldham, Spanish Fork, UT (US)

(73) Assignee: Oldham Associates, L.L.P., Springville, UT (US)

( * ) Notice: Subject to any disclaimer, the term of this patent is extended or adjusted under 35 U.S.C. 154(b) by 234 days.

(21) Appl. No.: 10/006,756

(22) Filed: Dec. 5, 2001

(65) Prior Publication Data

US 2003/0105774 A1 Jun. 5, 2003

Related U.S. Application Data

(60) Provisional application No. 60/254,209, filed on Dec. 8, 2000.

(51) Int. Cl.[7] .............................. G06F 17/00; G06F 7/00
(52) U.S. Cl. ................ 707/104.1; 707/102; 707/103 R; 709/217; 709/202
(58) Field of Search .............................. 707/2, 10, 3, 4, 707/7, 102, 104.1; 709/217, 218, 245

(56) References Cited

U.S. PATENT DOCUMENTS

| | | | |
|---|---|---|---|
| 5,864,863 A | * | 1/1999 | Burrows .................. 707/103 R |
| 5,864,871 A | * | 1/1999 | Kitain et al. .............. 707/104.1 |
| 5,966,710 A | * | 10/1999 | Burrows .................. 707/103 R |
| 5,999,940 A | * | 12/1999 | Ranger .................... 707/103 R |
| 6,061,738 A | | 5/2000 | Osaku et al. ................ 709/245 |
| 6,073,105 A | * | 6/2000 | Sutcliffe et al. ................ 705/1 |
| 6,076,733 A | | 6/2000 | Wilz, Sr. et al. ......... 235/426.01 |
| 6,108,656 A | | 8/2000 | Durst et al. .................... 707/10 |
| 6,199,048 B1 | | 3/2001 | Hudetz et al. ................. 705/23 |
| 6,212,522 B1 | | 4/2001 | Himmel et al. ................ 707/10 |
| 6,516,337 B1 | * | 2/2003 | Tripp et al. .................. 709/202 |

* cited by examiner

*Primary Examiner*—Charles Rones
*Assistant Examiner*—Jacques Veillard
(74) *Attorney, Agent, or Firm*—Daniel P. McCarthy; Parsons Behle & Latimer

(57) ABSTRACT

A system having a server or group of servers connected to a network providing redirection for entered information containing reference codes and series identifiers to URLs in a given database. That system with additional servers providing an entry form for the reference codes and series identifiers. Those systems operating with the HTTP protocol. A method of referencing a URL indexed by a provided reference code in a database and returning the indexed URL. That method using the HTTP protocol. A system whereby an entry is made to a URL referencing database, the entry being provided with either a URL and series identifier or a code, URL and series identifier.

15 Claims, 7 Drawing Sheets

SYSTEMS AND METHODS OF REFERENCING UNIFORM RESOURCE LOCATORS

CROSS-REFERENCE TO RELATED APPLICATIONS

This application claims the benefit of U.S. Provisional Application No. 60/254,209 filed Dec. 8, 2000.

BACKGROUND OF THE INVENTION

The invention relates generally to the automatic referencing of URLs by short codes contained in magazines and other printed materials and more specifically to the automatic referencing of URLs via a web browser using short codes included in any published (printed) materials.

Embedding URLs into printed stories and printed ads or other paper documents requires precise typing of very long sequences of letters and slashes. These URLs disrupt the reading on a printed page, and take up a lot of room. They are not easy for a reader to subsequently type into a browser to find the page represented by the URL. Even one single error and the URL will not work. And long URLs are not convenient for publishers to include in their printed products.

Presently, several companies provide bar codes and bar code scanners as a solution to this issue. GoCode, Quecat and Wulliweb are companies that have been trying to convince publishers of magazines, newspapers and catalogs to provide their readers with a bar code wand, which readers must install on their computers. They then use the scanner to scan a printed bar-code from their printed product into their computer to execute a complex URL. They must also supply publishers with special software that converts URLs into bar codes so that these bar codes can be pasted into lines of text as a graphic. The success of that system is based upon readers installing the bar code wands, and then taking the printed product to their computers, where they scan the code, or taking a wireless bar code reader to their computer and transmitting it the bar code information. The print quality of the bar code must be good enough for the bar code scanner to pick up, which is difficult on newsprint, and nearly impossible in fold areas. This solution is very expensive because of the cost of providing wands or other bar code reading devices ($35 to $50) to hundreds of thousands of readers. Additionally, the bar coding solutions offered so far are not compatible with each other. Yet all of them are receiving some acceptance in the marketplace because of print publishers' desire to drive traffic from their printed publications to advertisers' or other related web sites. Printed URLs are such an obstacle to this, that the publishers are willing to invest in sending free bar code scanners to thousands of readers, as Forbes's magazine and The Belo Corporation have done.

There is therefore a need for a way to provide a system of URL lookup that is easy for readers and publishers to use and that does not require additional hardware, such as bar code wands or readers.

BRIEF SUMMARY OF THE INVENTION

In a preferred embodiment, the invention provides a database wherein a URL may be referenced by a short reference code and a year. Software is provided so that new URLs may be added to the database and a corresponding reference code returned to a publisher. Software is also provided to permit a reader to enter the code in a web browser and have his browser automatically redirected to the URL. The invention thereby provides a system whereby a reader may enter a short reference code printed in a magazine or printed article and be directed a corresponding web site of interest.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
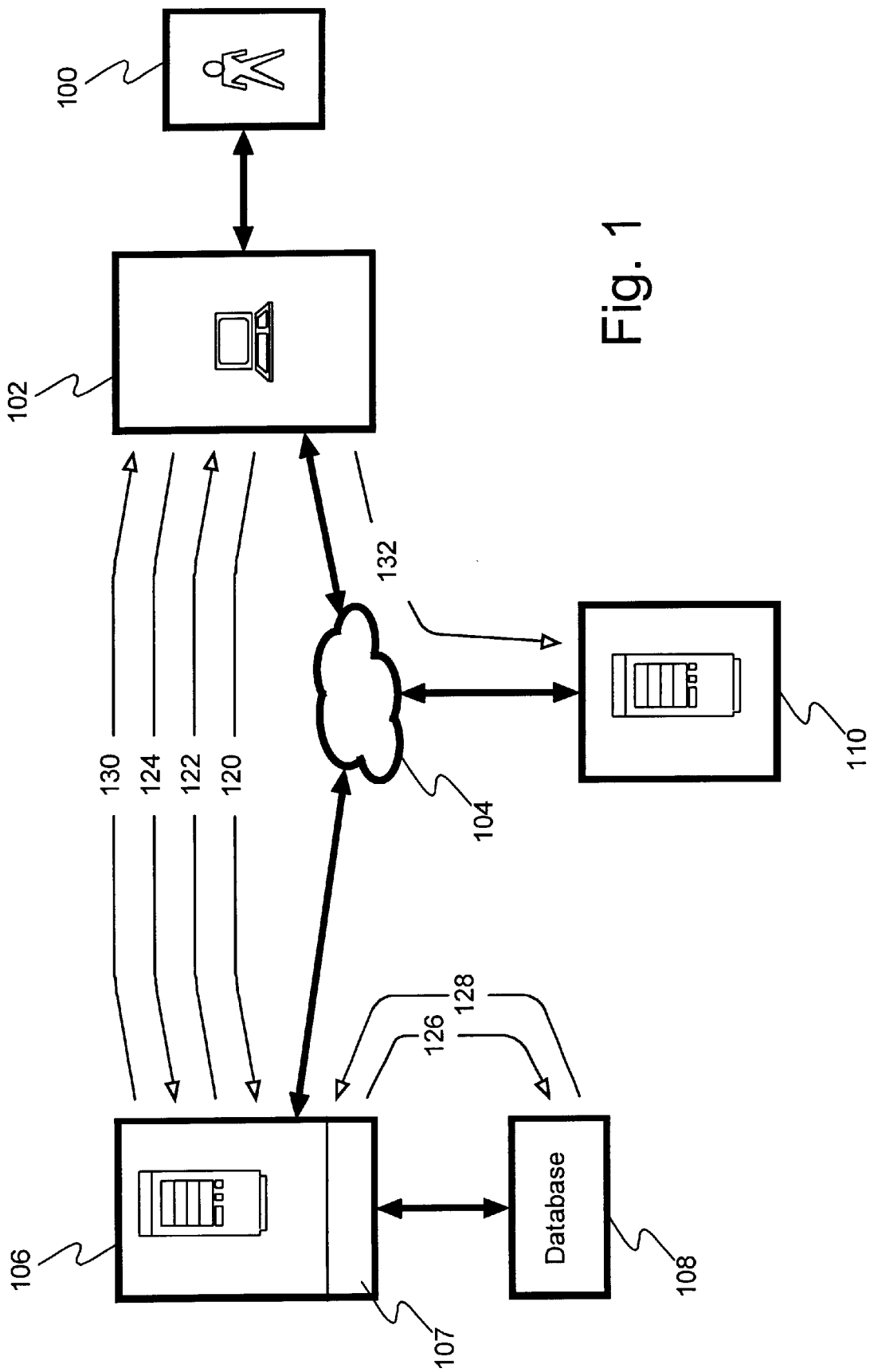
FIG. 1 illustrates a configuration and data flow of a system of the invention whereby a reader may be directed to a URL.

The following definitions are provided for the orientation of the reader.

HTTP—HyperText Transfer Protocol. A protocol enabling a computer to request and receive objects from a remote server. These objects are often HTML files, but may also be any digital object utilizing a known format. HTTP Version 1.1 is documented in RFC 2068; version 1.0 (depricated) is documented in RFC 1945.

NSP—A network service provider. An entity providing access to HTTP servers to customers. An NSP may be an Internet service provider, or other provider of content having an internal network not necessarily extending to the Internet.

URL—Uniform Resource Locator. An address for a particular object on the Internet. Examples are www.dtint.com and www.uspto.gov.

In a preferred embodiment a simple alphanumeric code, such as A2Y5, replaces a complex URL. Each code is unique and may be used by the publisher of any printed product to refer to URLs therein. The publisher would use this application while preparing stories or other material. In that embodiment a reference code is created by an application available via a web browser, the editor entering a URL of any length and being returned the created reference code. This code can then be pasted or typed into the text that ends up being printed. The URL and the code are stored in a database for future access.

After the publication has reached its readers, the readers would notice the codes embedded in the stories or associated with products in a catalog. The reader of the printed piece— newspaper, magazine or catalog, etc.—would be instructed to go to the home page of the publication and type this simple code into the form on that web page, which is a system of that preferred embodiment of the invention. It would accept the code, reference the database running at the publisher's own site, and look up the associated URL. It would immediately redirect the user's browser directly to the page referenced by this URL, whether the page was available locally, or whether it existed anywhere else in the entire internet. The reader can thereby easily access web pages referred to in publications by having to type only a brief code.

A solution implementing that preferred embodiment generally requires two web-based software programs and one database. The first software program is available during the text preparation stage that enables an editor to enter a URL in a web browser and receive a computed code in return. This application stores the URL and related code in a database. The second application runs as part of any web page, and enable readers to enter the code in a form in a web browser and have the long URL executed as if they had typed it into the browser's address bar. Both programs share access to the same database, or a replica of the same database. It is expected that each publisher will desire to host their own copy of the database as well as the web-based applications on their own intranet web server. However, all of this could also be done remotely from an Application Service Provider who could host the database and applications.

This software-only solution is much superior to the bar code approach. It is easier for the publisher to use an alphanumeric code based on a normal type face in their publication, than it is to use a bar code graphic mixed in with text. It is easier for the reader because there is nothing to install or learn to use. It is easier for the reader to type a brief code into their browser than it is to get the publication spread out in front of their computer and then operate the hand-held scanner to scan in the code. The whole solution is significantly less expensive than having to send bar code wands to thousands of readers, help them install the wands on their computers, and even maintain them when the hardware fails.

This solution does require that the reader go first to the publisher's web site, instead of bypassing it and going directly to a different URL. This should be an advantage to the publisher in that it attracts traffic to their home page, rather than bypassing it as the bar codes do. Home pages of publications are relatively easy to locate, and can easily be bookmarked so that this does not represent a disadvantage to the reader.

There may be a concern about the number of codes available to any given publisher. With all the numbers and letters and symbols of the alphabet, there would be about 1.67 million unique codes, based upon using a 4 place code. (More with 5, fewer with 3, but which are both viable uses of this concept. Also by using upper and lower case alphabet characters there would be about 14 million codes using a 4 place code.) But since these codes are used in printed publications with publication dates, by adding the date or year of the publication for older information—information more than a year old for example—the codes could be recycled indefinitely. For current information, only the 4 digits would need to be typed. For last year or the year before, add the year and the 4 digit code and the number should cover almost any need for any publication.

In a preferred embodiment of the invention, a relational database is used. The database would correspond to a given publication and its home page. In that embodiment, the database table would be made up of the following four columns:

| Year | Code | Full URL | Entry made by: |
|------|------|----------|----------------|
| 2001 | 123a | www.dtint.com/sports/college | Don Oldham |
| 2001 | 123b | www.maccentral.com/news | Don Oldham |
| 2001 | 123c | www.ucjournal.com | Don Oldham |

In that embodiment the Year column contains the year of the publication in which the code is printed. This field will be filled in at the time the full URL is entered, from the creator entry form. By default it will contain the current year as read from the computer system, but will allow an operator to override the year, particularly in cases where material is being prepared in the current year, but will be published the following year. The Code column contains a unique code, which is generated by the creator software. It is created by incrementing the 4 positions of the code (or 3 or 5), one character or number at a time until all possible combinations of 0–9 and A–Z have been exhausted. The Full URL column contains the entire URL address that is being referenced. For ease of entry, the creator software will pre-enter http://, but allows this to be over-ridden by the operator in order to reference secure sites or other sites which have a different http variation. The Entry made by column contains the logon name of the person who enters the URL. This logon name will be gathered from the logon screen of the creator application. This column is for the purpose of tracking who made which entries in the database for purposes of accountability. The accuracy of the full URL is critical to the successful operation of the software. It needs to be entered only once, but it must be entered correctly.

FIG. 1 illustrates by example a system of the invention. A user 100 operating a web browser or like software on a terminal 102 is connected to a network 104, two examples of network 104 being the Internet or NSP network. A server 106 in communication to network 104 provides HTTP communication, such communication providing HTML pages to terminal 102 in a preferred embodiment. Database 108 accessible to server 106 contains records containing at least the fields of a code, a series identifier, a URL, and optionally a name. Destination server 110 provides HTTP communication to computers such as terminal 102 through network 104.

An example of the operation of the system of the invention of FIG. 1 follows. First, user 100 directs a web browser or other software to a URL, which sends an HTTP request 120 to server 106, network 104 and server 106 being configured to receive and process HTTP requests for the URL. Server 106 then sends an HTTP response 122, using HTML or another protocol, containing a form having text fields whereby the user may enter a reference code and a series identifier. Web browser running on terminal 102 displays the form and enables the user 100 to enter either a reference code alone or both a reference code and a series identifier. The user 100 causes the information entered to the form to be sent to server 106 in a second HTTP request 124, the action being triggered by the user 100 clicking on a "go" button or other mechanism. Server 106 receives the second HTTP request. If the second HTTP request did not contain a series identifier, a default series identifier is asserted. A request 126 is made of database 108 to find the record having the series identifier and reference code stored thereon. In a response 128 to the request database 108 may send at least the URL associated to the series identifier and reference code if that record is in existence, or database 108 may send an error message indicating failure to locate a record containing the series identifier and reference code. A second HTTP response 130 is constructed that may contain the returned URL or a message indicating an invalid reference code. The second HTTP message might be an HTML file containing the returned URL as a link, in which case user 100 clicks on the link and the browser is directed to destination server 110. The second HTTP response may also be a command to the browser running on terminal 102 to automatically go to the returned URL, an example of such a command being a "location" HTTP command. In that case, the browser running on terminal 102 automatically sends an HTTP request to destination server 110, such action intending to return the page of the URL stored in the database referenced by the code and series identifier of the user's entry.

Figure 2:
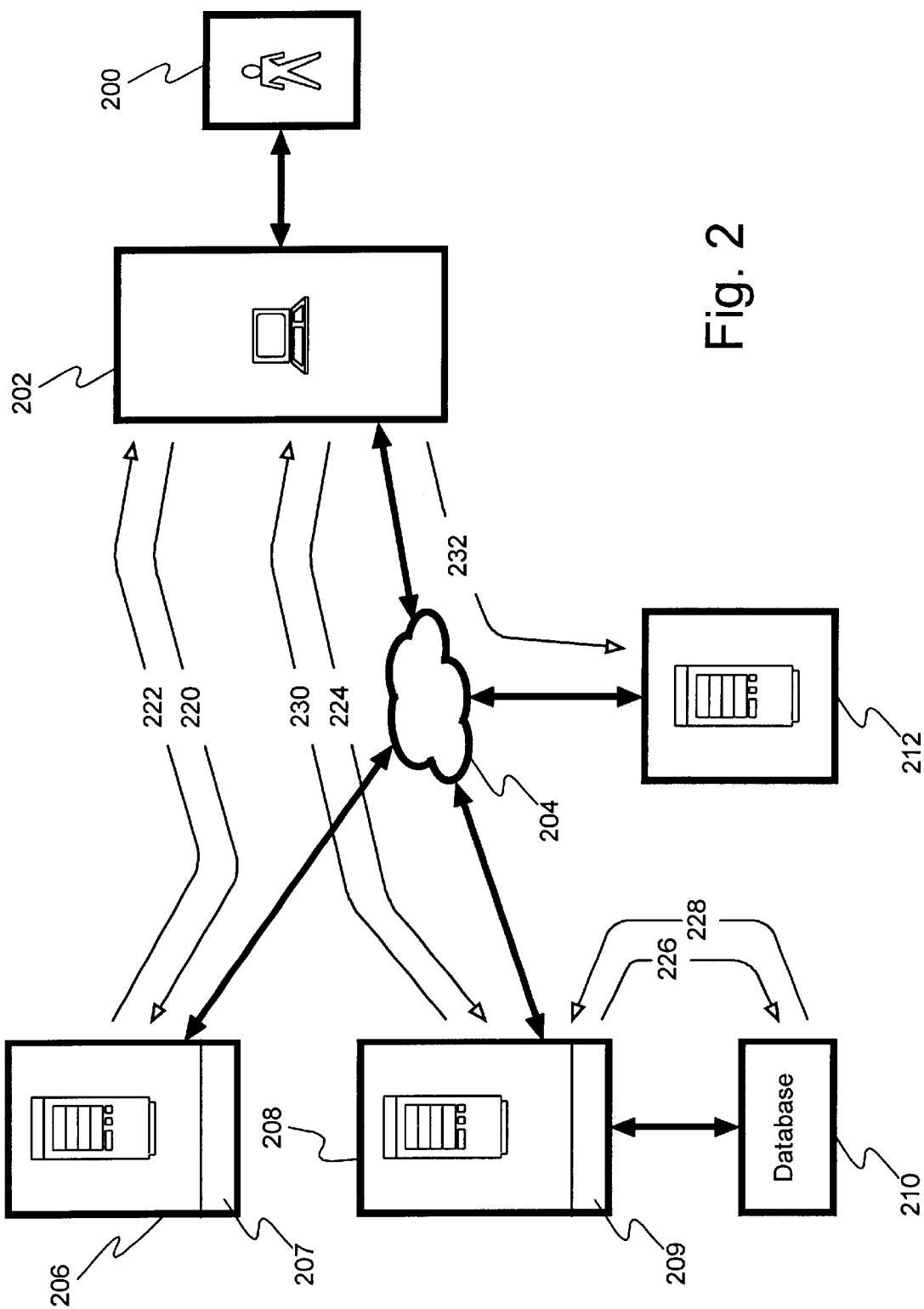
FIG. 2 illustrates a configuration and data flow of another system of the invention whereby the reader entry form and URL direction are provided by different servers.

FIG. 2 illustrates by example another system of the invention. A user 200 operating a web browser or like software on terminal 202 is connected to network 204. Servers 206 and 208 are in electronic communication with network 204 through HTTP communication. Software 207 and 209 is installed to servers 206 and 208 enabling HTTP communication as individually described. Database 210 accessible to server 208 contains records containing at least the fields of a code, a series identifier, a URL, and optionally a name. Destination server 212 provides HTTP communication to computers such as terminal 202 through network 204. An example of the operation follows. User 200 directs a web browser or other software to a URL, which sends an HTTP request 220 to server 206, network 204 and server 206 being configured to receive and process HTTP requests for the URL. Server 206 then sends an HTTP response 222, using HTML or another protocol, containing a form having text fields whereby the user may enter a reference code and a series identifier. Web browser running on terminal 202 displays the form and enables the user 200 to enter either a reference code alone or both a reference code and a series identifier. The user 200 causes the information entered to the form to be sent to server 208 in a second HTTP request 224. Server 208 receives the second HTTP request, and if the second HTTP request does not contain a series identifier a default series identifier is asserted. A request 226 is made of database 210 to find the record having the series identifier and reference code stored thereon. In a response 228 to the request database 210 may send at least the URL associated to the series identifier and reference code if that record is in existence, or database 210 may send an error message indicating failure to locate a record containing the series identifier and reference code. A second HTTP response 230 is constructed that may contain the returned URL or a message indicating an invalid reference code. Again the second HTTP message may be an HTML response containing the returned URL as a link, or the HTML response may contain a command to forward the browser to the returned URL as described above. The web browser may then be directed to a destination server serving the returned URL on action of the user directing the browser to the returned URL or the browser self-directing through the command.

Figure 3:
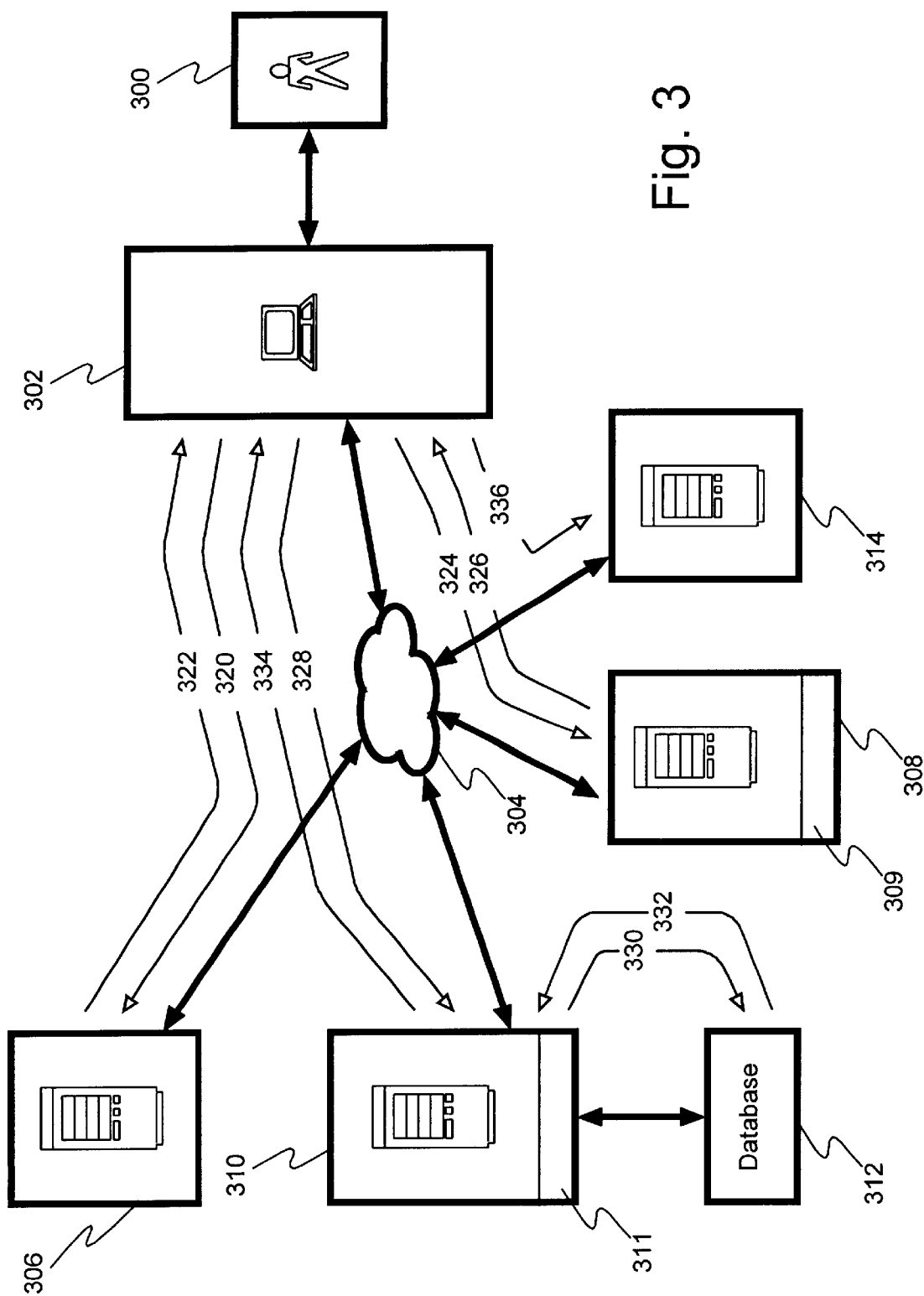
FIG. 3 illustrates a configuration and data flow of another system of the invention whereby the reader entry form is referenced by a separate server.

FIG. 3 illustrates by example another system of the invention, by which the entry form is referenced by a web page on a separate server. A user 300 operating a web browser or like software on terminal 302 is connected to network 204. Servers 306, 308, and 310 are in electronic communication with network 304 through HTTP communication. Software 309 and 311 is installed to servers 308 and 310 enabling HTTP communication as individually described. Database 312 accessible to server 310 contains records containing at least the fields of a code, a series identifier, a URL, and optionally a name. Destination server 314 provides HTTP communication to computers such as terminal 302 through network 204. An example of the operation follows. User 300 directs a web browser or other software to a URL, which sends an HTTP request 320 to server 306, network 304 and server 306 being configured to receive and process HTTP requests for the URL. Server 306 then sends an HTTP response 322, using HTML or another protocol, containing a second URL. Web browser running on terminal 302 interprets the second URL and sends a second HTTP response 324 to server 308, network 304 and server 308 being configured to receive and process HTTP requests for the second URL. Server 308 then sends an HTTP response 326, using HTML or another protocol, containing a form having text fields whereby the user may enter a reference code and a series identifier. Web browser running on terminal 302 displays the form and enables the user 300 to enter either a reference code alone or both a reference code and a series identifier. The user 300 causes the information entered to the form to be sent to server 310 in a third HTTP request 328. Server 310 receives the third HTTP request, and if the third HTTP request does not contain a series identifier a default series identifier is asserted. A request 330 is made of database 312 to find the record having the series identifier and reference code stored thereon. In a response 332 to the request database 312 may send at least the URL associated to the series identifier and reference code if that record is in existence, or database 312 may send an error message indicating failure to locate a record containing the series identifier and reference code. A second HTTP response 334 is constructed that may contain the returned URL or a message indicating an invalid reference code. The web browser may then be forwarded 336 to destination server 314 as described above in FIGS. 1 and 2.

Figure 4:
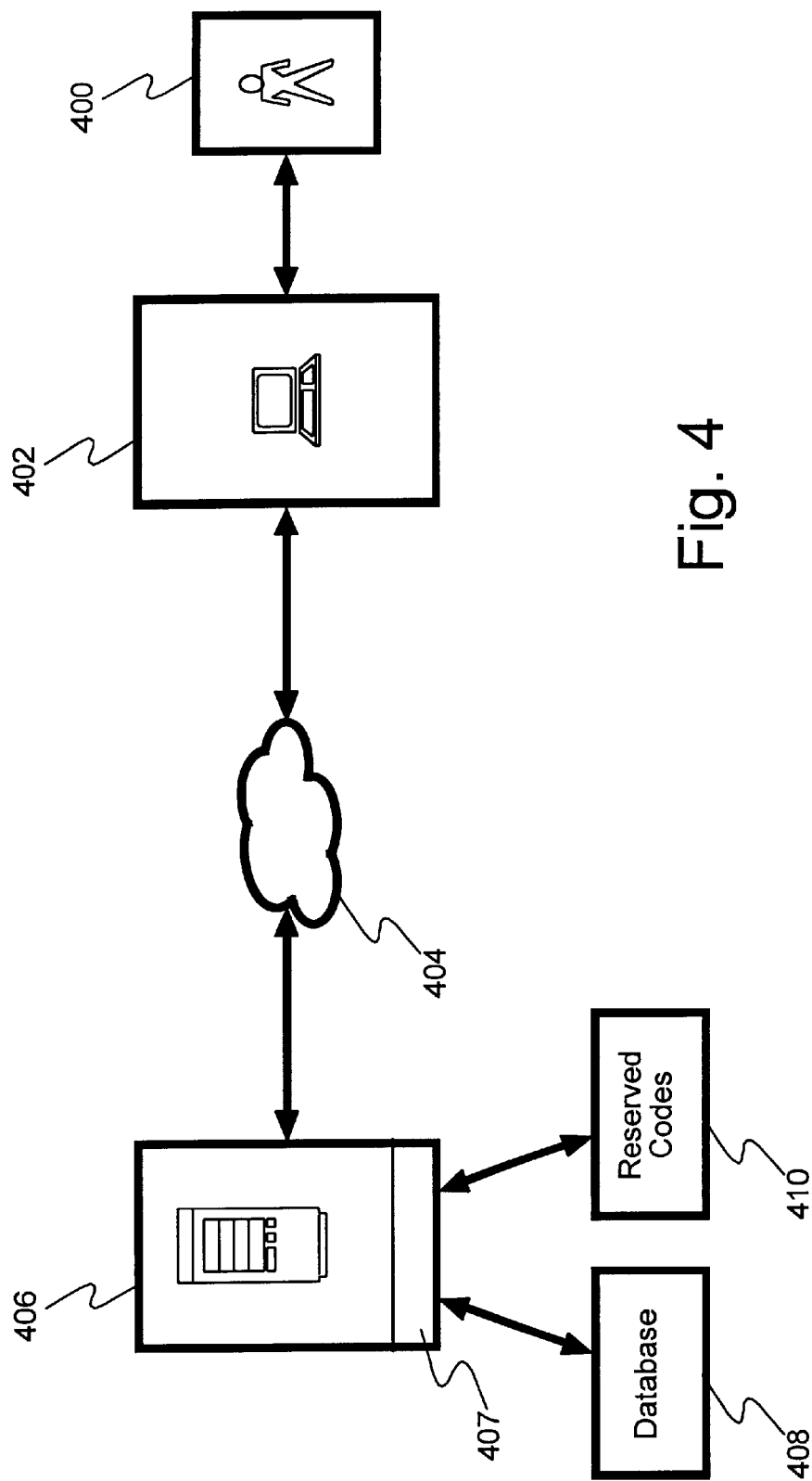
FIG. 4 illustrates a configuration of another system of the invention whereby entries are made to a database.

FIG. 4 illustrates by example a further system of the invention. An operator 400 operating a web browser or like software on terminal 402 is connected to a network 404. Server 406 is in electronic communication with terminal 402 and has software 407 installed performing the functions as described. Database 408 is accessible to server 406 and contains records including at least the fields of a code, a series identifier, a URL, and optionally a name. A list of reserved codes 410 accessible to server 406 is an optional component of the system. Operation is as follows. Operator 400 through the use of a web browser or other software sends an HTTP request using a specific URL directed to server 406. Server 406 sends an HTTP response, using HTML or another protocol, containing a form having text fields whereby the user may enter a URL, a series identifier, and a code. Operator 400 fills in necessary fields, and submits the form in a second HTTP request to server 406. Server 406 then interprets the submitted information and may create a new entry for the that information. Server 406 responds to the second HTTP request to terminal 402 indicating the effect of the operator's submission. Server 406 asserts a default series identifier if one is not provided by the operator. If the operator's entry contains a URL and not a code, the server 406 will retrieve any record in database 408 containing the entered URL in the URL field. If a record is found, the associated code is reported to the operator in an HTTP response. If a record is not found, a new code is selected that has not been used in database 408. If list of reserved codes 410 is provided the server 406 will not select a new code also in the list 410. The new code is then reported to the operator. If the operator's entry contains a URL and a code, the server 406 will first check for a record in database 408 that contains the entered code. If an entry is found, the server 406 will report that as an error to operator 400. If an entry is not found, then server 406 may optionally check for a record containing the entered URL and notify the operator 400 if such a record is found. Server 406 may then create a new record in database 408 corresponding to the entered URL and entered code. Server 406 may accept additional HTTP requests and send additional HTTP responses to provide user authentication to prevent unauthorized persons from making entries in the database 408.

Figure 5:
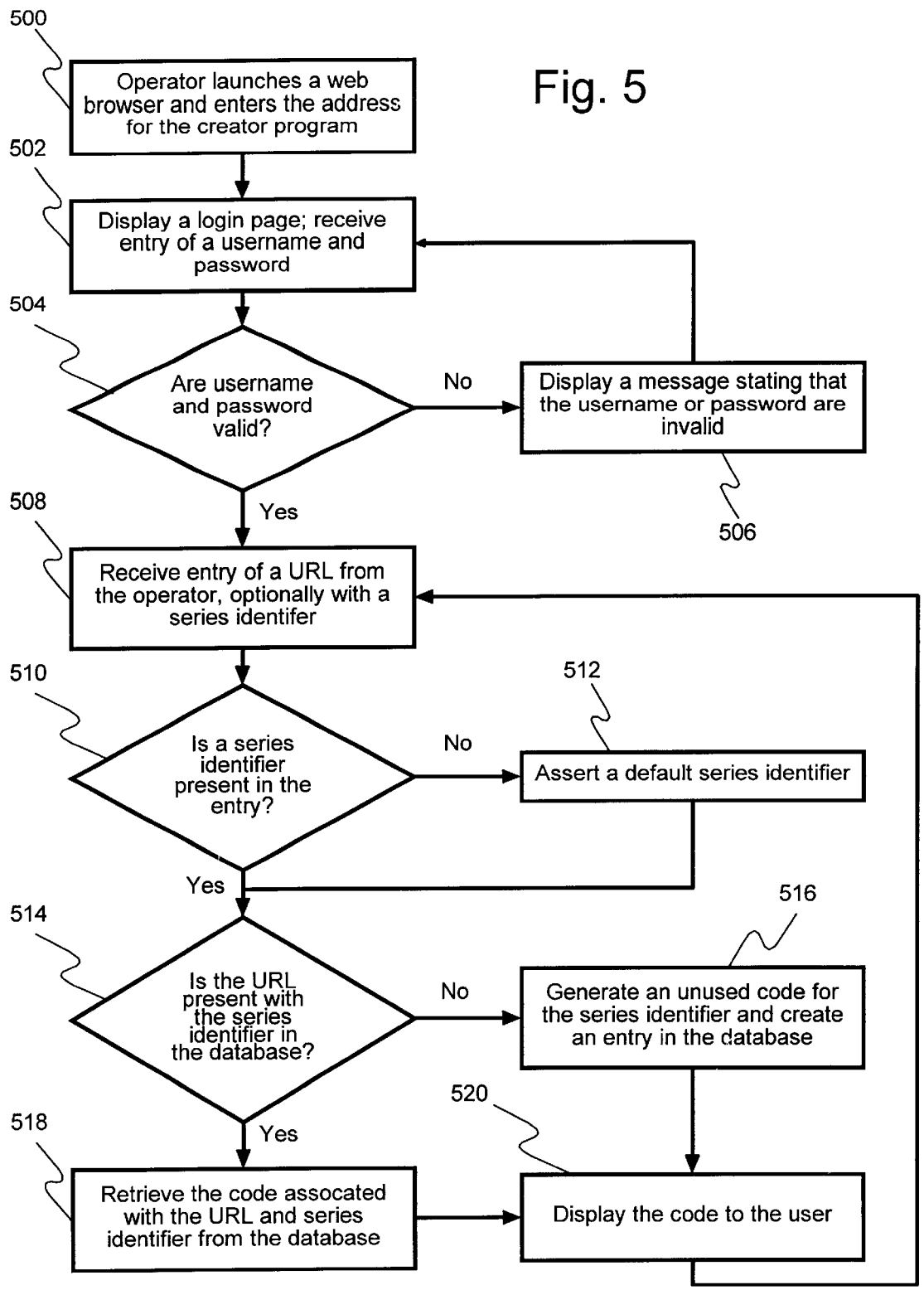
FIG. 5 illustrates the process flow of a system of the invention whereby an operator may make new entries to a database.

FIG. 5 illustrates by example the operation of the server 406 exemplified in FIG. 4. In step 500 the operator starts a web browser or like application and enters the address or URL of the creator program. The browser receives and displays a login page from the server, containing fields for entry of a username and password, as shown in step 502. Upon entry of the fields the server authenticates the entries as shown in step 504 and may display an error message if an invalid username and password were given as shown in step 506. The browser receives and displays entry fields for a URL and optionally a series identifier, the entry of the fields being shown in step 508. Entry of at least a URL is required to proceed to step 510. If a series identifier is not entered, a default series identifier is asserted as shown in steps 510 and 512. If there is a record in the database containing the URL, then the code associated to that URL is retrieved and reported to the user as shown in steps 514, 518, and 520. If there is not a record in the database containing the URL, then a new unused code is generated, a new record is created in the database, and the code is reported to the user as shown in steps 514, 516, and 520. Execution may repeat to receive as many successive URLs as the operator desires.

Figure 6:
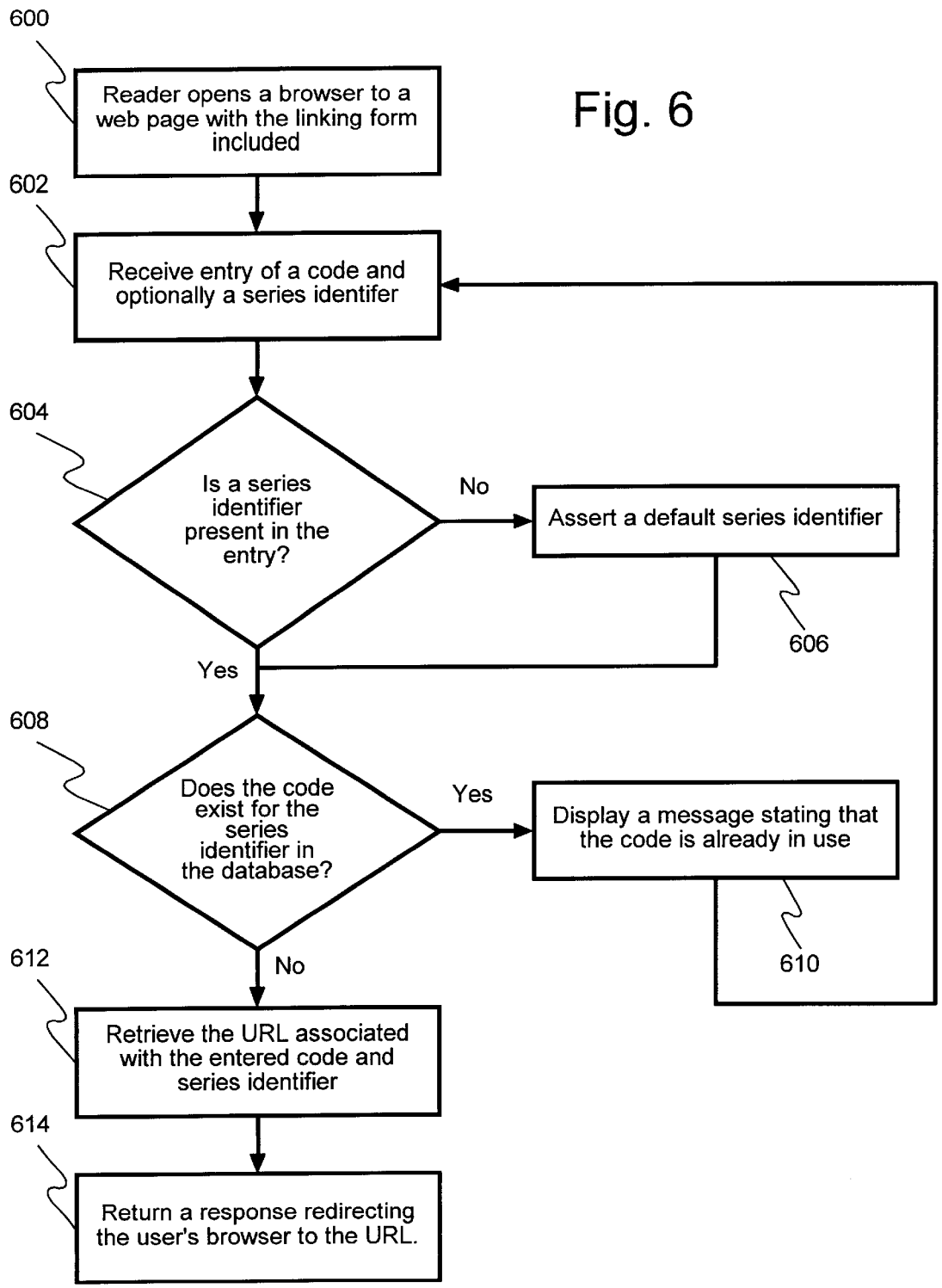
FIG. 6 illustrates the process flow of a system of the invention whereby a reader's browser is redirected to a referenced URL.

FIG. 6 illustrates by example the operation of systems of the invention as shown in FIGS. 1, 2, and 3. A reader notices a code and a URL in a publication or on some other readable article. The reader starts a browser and enters the URL, as shown in step 600. The browser displays an entry field for a code and optionally a series identifier. The reader then enters at least the code, and submits the entered information to a server, as shown in step 602. The server checks for an entered series identifier, and asserts a default number if one was not provided, as shown in steps 604 and 606. The server then checks for a record containing the code and series identifier in the database, as shown in step 608. If such a record is not present, the reader is notified in a return message as shown in step 610. If the record is present, then the associated URL is retrieved from the database and a response is sent to the readers browser redirecting it to the retrieved URL.

Figure 7:
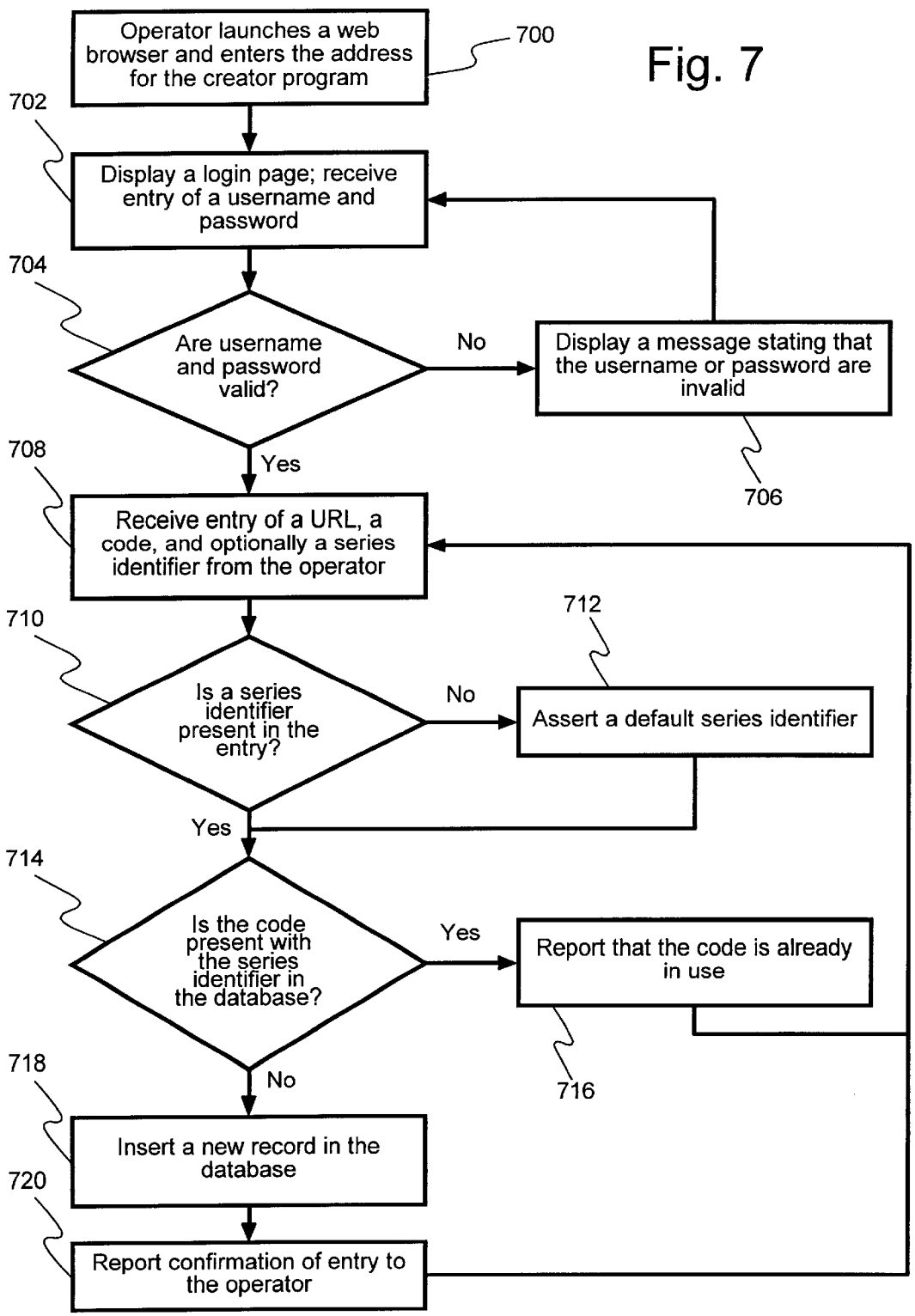
FIG. 7 illustrates the process flow of a system of the invention whereby an operator may make a new entry to a database, the operator specifying a code.

FIG. 7 illustrates by example the operation of the server 406 exemplified in FIG. 4. In step 700 the operator starts a web browser or like application and enters the address or URL of the creator program. The browser receives and displays a login page from the server, containing fields for entry of a username and password, as shown in step 702. Upon entry of the fields the server authenticates the entries as shown in step 704 and may display an error message if an invalid username and password were given as shown in step 706. The browser receives and displays entry fields for a URL, a code, and optionally a series identifier, the entry of the fields being shown in step 708. Entry of at least a URL and a code are required to proceed to step 710. If a code is not provided then execution may proceed as given from step 510 in FIG. 5. If a series identifier is not given in the entry, a default series identifier is asserted as shown in steps 710 and 712. If there is a record in the database containing the entered code a report of that is made to the user as shown in steps 714 and 716, and a new entry is not made to the database. Otherwise a new record is created in the database, and confirmation of creation of the new entry is reported to the user as shown in steps 718 and 720. Execution may repeat to receive as many successive URLs as the operator desires.

In a preferred embodiment a series identifier takes the form of a full four digit year, although it may be desired to use less than the full four digits. If that is desired then the least significant digits of the year will provide the most useful series separation.

It will be recognized by those skilled in the art that the service of HTTP requests may be made in a distributed way, whereby multiple computers or servers may receive, process, and respond to HTTP requests for a single URL. The reader should not construe the discussion above referencing a single computer servicing HTTP requests to indicate that this invention considers only such systems, but rather the discussion above is meant to be inclusive of such distributed systems.

What is claimed is:

1. A URL referencing system, comprising:
   (a) a first group of one or more computers connected to a network;
   (b) a database accessible to said computers of said first group, said database containing records having the fields of a reference code wherein said reference code consists of a series of letters and numbers, a series identifier wherein said series identifier is a one to four digit number representing a year, a URL, and optionally a name, the records being indexable by at least a reference code and a series identifier;
   and (c) first computer readable instructions installed to said computers of said first group, said first instructions implementing the functions of:
      (i) receiving first HTTP requests through the network, the first requests containing index information from users, the index information including at least a reference code and optionally a series identifier,
      (ii) asserting a default series identifier if a series identifier is not provided in said first HTTP requests,
      (iii) retrieving a URL and a status from said database using the index information, the status indicating the presence or absence of a record associated with said index in said database,
      (iv) forming first HTTP replies containing the retrieved URL if said status indicates a record exists for the index information in said database, the first HTTP replies containing an error response if the status indicates a record does not exist for the index information in said database,
      and (v) sending the first HTTP replies through the network to the users that initiated the first HTTP requests.

2. The system of claim 1, further comprising:
   (d) a second group of one or more computers connected to said network, said computers of second group not necessarily being mutually exclusive of said first group;
   and (e) second computer readable instructions installed to said computers of said second group, said second instructions implementing the functions of:
      (i) receiving second HTTP requests,
      and (ii) sending second HTTP replies in response to said second HTTP requests, said HTTP responses containing entry fields for the index information.

3. The system of claim 1, wherein:

the first HTTP replies contain a command to cause a web browser to be forwarded to the retrieved URL.

4. The system of claim 1, wherein:

a reference code consists of a series of between three and five letters and numbers.

5. The system of claim 4, wherein:

a reference code consists of a series of four letters and numbers.

6. A method of directing a user to a URL using a short reference code, said method comprising the steps of:

receiving index information through electronic communication from a user, the index information including at least a reference code wherein said reference code consists of a series of letters and numbers and optionally a series identifier wherein said series identifier is one to four digit number representing a year;

asserting a default series identifier if a series identifier is not provided with the index information;

retrieving a URL from a database using the index information;

forming a message containing the retrieved URL;

and sending the message through electronic communication to the user.

7. The method of claim 6, further comprising:

said receiving is by an HTTP request;

and said message is an HTTP response.

8. The method of claim 6, further comprising:

the retrieved URL directs the user to an error message if there is not a record for the index information in the database.

9. The method of claim 6, wherein:

a reference code is a sequence of three to five letters and numbers.

10. The method of claim 9, wherein:

a reference code is a sequence of four letters and numbers.

11. A URL reference entry system, comprising:

(a) a database designed to contain records, said records having the fields of a reference code, a series identifier wherein said series identifier is a one to four digit number representing a year, a URL, and optionally a name;

and (b) a computer system in communication with said database, said computer system having memory, said memory having computer readable instructions implementing the functions of: (i) receiving a first HTTP request containing an entered URL, and optionally an entered series identifier (ii) asserting an entered series identifier of a default series identifier if an entered series identifier is absent in the first HTTP request, (iii) first testing for the presence of a record containing the entered URL in the URL field of said database, said first testing indicating absence or presence, (iv) on condition of said second testing indicating presence, identifying a return code by retrieving the reference code in the record containing the entered URL in the URL field from said database, (v) on condition of said second testing indicating absence, creating an unused reference code and inserting a record in the database for the created reference code having the entered URL in the URL field, the entered series identifier in the series identifier field, and the created code in the code field, and (vi) returning a first HTTP response containing the created code.

12. The system of claim 11, said instructions further implementing the functions of:

(vii) receiving an authentication token;

and (viii) validating the authentication token.

13. The system of claim 12 in which said authentication token comprises a username and a password.

14. The system of claim 11, further comprising:

a list of reserved reference codes readable by said instructions;

and said creating an unused reference code excludes codes in said list.

15. The system of claim 11, wherein:

said receiving a first HTTP request further optionally contains an entered code;

and said instructions further implement the functions of:

(i) second testing for the presence of a record containing the code in the code field of said database, said second testing indicating absence or presence;

(ii) on condition of said second testing indicating absence, inserting a new record in said database, the record having the entered code in the code field, the entered series identifier in the series identifier field, and the URL in the URL field;

(iii) on condition of said second testing indicating absence, returning an HTTP response containing a confirmation of entry of a new record to said database, the new record having the URL and code of the first HTTP request in the URL and code fields, respectively;

and (iv) on condition of said second testing indicating presence, returning an HTTP response containing a notification that the requested code is already in use.

* * * * *